United States Patent [19]
Schlough

[11] 3,954,170
[45] May 4, 1976

[54] ROCK SLAB TURNOVER DEVICE
[75] Inventor: Thomas L. Schlough, St. Cloud, Minn.
[73] Assignee: Park Tool Company, St. Cloud, Minn.
[22] Filed: Dec. 30, 1974
[21] Appl. No.: 537,181

[52] U.S. Cl. .......................... 198/236; 198/127 R; 214/1 QA
[51] Int. Cl.² ........................................ B65G 47/24
[58] Field of Search ........... 198/236, 237, 127, 278; 214/1 QA, 1 Q

[56] References Cited
UNITED STATES PATENTS

| | | | |
|---|---|---|---|
| 1,390,853 | 9/1921 | Worth | 214/1 QA |
| 2,527,024 | 10/1950 | Mitchell | 198/237 |
| 3,583,575 | 6/1971 | Jowsey et al. | 214/1 Q |
| 3,589,532 | 6/1971 | Filkins | 214/1 QA |
| 3,727,744 | 4/1973 | Willard | 198/237 |

Primary Examiner—Robert J. Spar
Assistant Examiner—James M. Slattery
Attorney, Agent, or Firm—Orrin M. Haugen

[57] ABSTRACT

A work turnover conveyor for stone slabs and the like. The conveyor in its normal position includes, in continuation, a work input section, a work turnover section, and a work output section. The work turnover section is comprised of first and second segments each of which is arranged to be pivoted arcuately about an axis at right angles to the conveyor section axis. A slide guide is arranged laterally along the first and second segments forming the work turnover section, and hydraulic cylinders are provided for pivoting the first and second segments downwardly at their free ends to a substantially vertical disposition with the respective ends of the segments accordingly being spaced apart one from the other at opposed ends of the slide guide so as to form a U-shaped cradle, thus achieving turnover of the stone slab upon continued articulation of the conveyor to the normal position.

3 Claims, 11 Drawing Figures

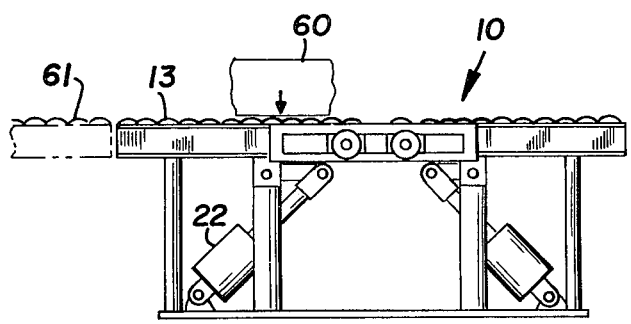
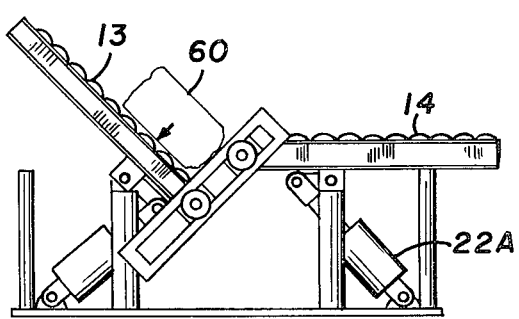
FIG.6   FIG.7
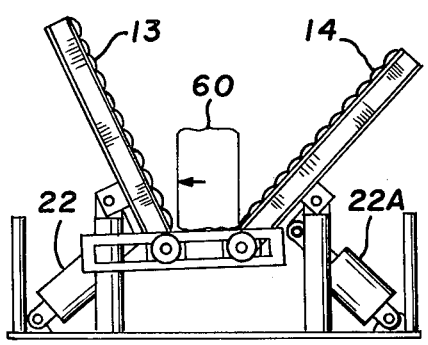
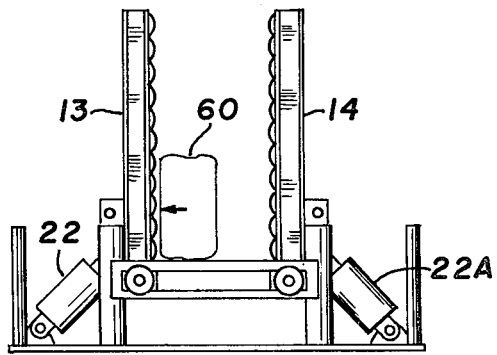
FIG.8   FIG.9
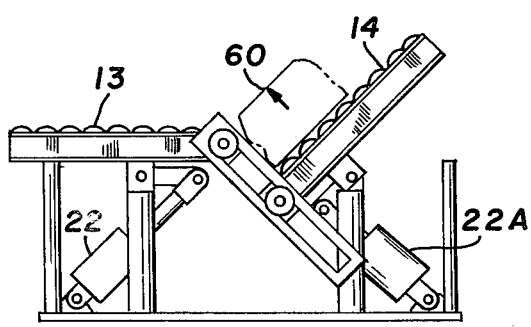
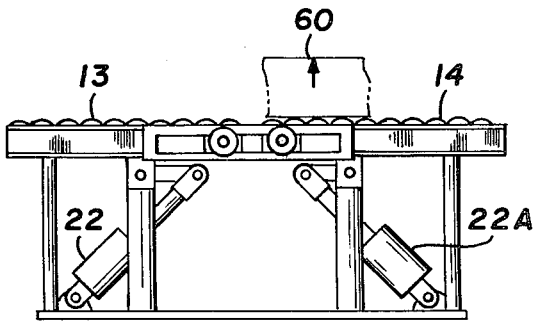
FIG.10   FIG.11

ROCK SLAB TURNOVER DEVICE

BACKGROUND OF THE INVENTION

The present invention relates generally to an improved system for turning heavy loads or objects such as stone slabs or the like, and more particularly to such a conveyor means which includes a turnover section for utilization when indicated.

In the treatment of large objects such as stone monuments and the like, it is necessary to treat various surfaces of the work or objects, and in particular, the opposed major surfaces thereof. Generally speaking, the opposed major surfaces are chipped or otherwise treated by sequential operations, with the operator normally turning or otherwise rotating the work between the treatment on opposed surfaces. In the course of this effort, it is, of course, helpful to have a mechanical means for turning or rotating the work between operations, without the turning requiring lifting and rotating of the load.

In installations equipped for the treatment of stone or other heavy objects, conveyor systems are frequently employed for transporting the work between individual operations. These conveyors frequently employ cylindrical rollers mounted on spaced centers, with the conveyor extending continuously between adjacent work stations. For the actual transport of the load on the conveyor, mechanical means may be employed to either apply a force against the work, or drive means may be employed for certain of the cylinders so as to move or otherwise transport the work therealong. The turnover device of the present invention may advantageously be employed in a conventional conveyor system, and may be utilized on an as-required basis, with the device otherwise operating as a conventional conveyor.

SUMMARY OF THE INVENTION

Briefly, in accordance with the present invention, the turnover means of the present invention includes a conveyor having a work input section, a work turnover section, and a work output section, with each of the sections being disposed in a generally horizontal disposition. The turnover section, which is interposed between the input and output sections, comprises first and second segments, generally equal in length, with the segments terminating along mutually adjacent opposed surfaces. Axially extending slide means are arranged laterally of the segments forming the turnover section, with the slide means arranging for adjustably coupling the individual segments together, and permitting relative motion to occur between the opposed ends thereof. The slide means generally form extensions of the side rails for the conveyor segments, and specifically function as extensions of the side rails for the first and second turnover segments at their juncture point. Articulating means are provided for each of the segments, with the articulating means including pivot means which pivotally mount each of the segments intermediate the ends thereof, and arranged for pivotal rotation of the segment about a generally horizontal stationary pivot axis. Power sources are provided for delivering reciprocatory motion to the segments, with link means coupling each of the power sources to the turnover segments at points spaced from the pivot axis. The pivotal motion is such so as to permit general vertical rotational disposition of each of the turnover segments, with the ends thereof being spaced apart axially one from the other, at opposed ends thereof by means of the coupling slide means. In operation, therefore, the work enters the turnover means along the conveyor section forming the input section, and moves to a point generally adjacent the juncture point between the first and second segments forming the turnover section. At this point, forward motion of the work is stopped, and the articulating means are actuated so as to pivotally rotate the first segment of the turnover section in a direction so as to raise the portion adjacent the work input section, and drop the portion adjacent the mutually opposed surfaces between the first and second segments. The pivotal rotation is continued, and pivotal rotation of the second segment is commenced in order to form a generally U-shaped cradle with the legs of the cradle being formed by the first and second segments, and with the base being formed by the slide coupling means. Thereafter, the first segment is rotated back to its original disposition, and thereafter, the second segment is returned to its original disposition, whereupon the slab has been rotated 180° through the series of articulating movements.

Therefore, it is a primary object of the present invention to provide an improved work turnover means for stone slabs and the like which comprises a conveyor means having a work turnover section interposed between an input section and an output section, wherein the work turnover section is capable of functioning as a conventional conveyor, and also capable of functioning to turn loads thereon by either 90° or 180°.

It is yet a further object of the present invention to provide an improved work turnover means for stone slabs and the like which comprises a conveyor arrangement having an input section, an output section, and a work turnover section interposed therebetween, the work turnover section being arranged to turn or otherwise rotate the work on the conveyor, without requiring lifting or removal from the conveyor.

Other and further objects of the present invention will become apparent to those skilled in the art upon a study of the following specification, appended claims, and accompanying drawings.

BRIEF DESCRIPTION OF THE DRAWINGS

FIGS. 6–11 inclusive are side elevational views showing a typical sequence of operation for the turnover device of the present invention, and illustrating a workpiece moving through the device.

DESCRIPTION OF THE PREFERRED EMBODIMENT

Figure 1:
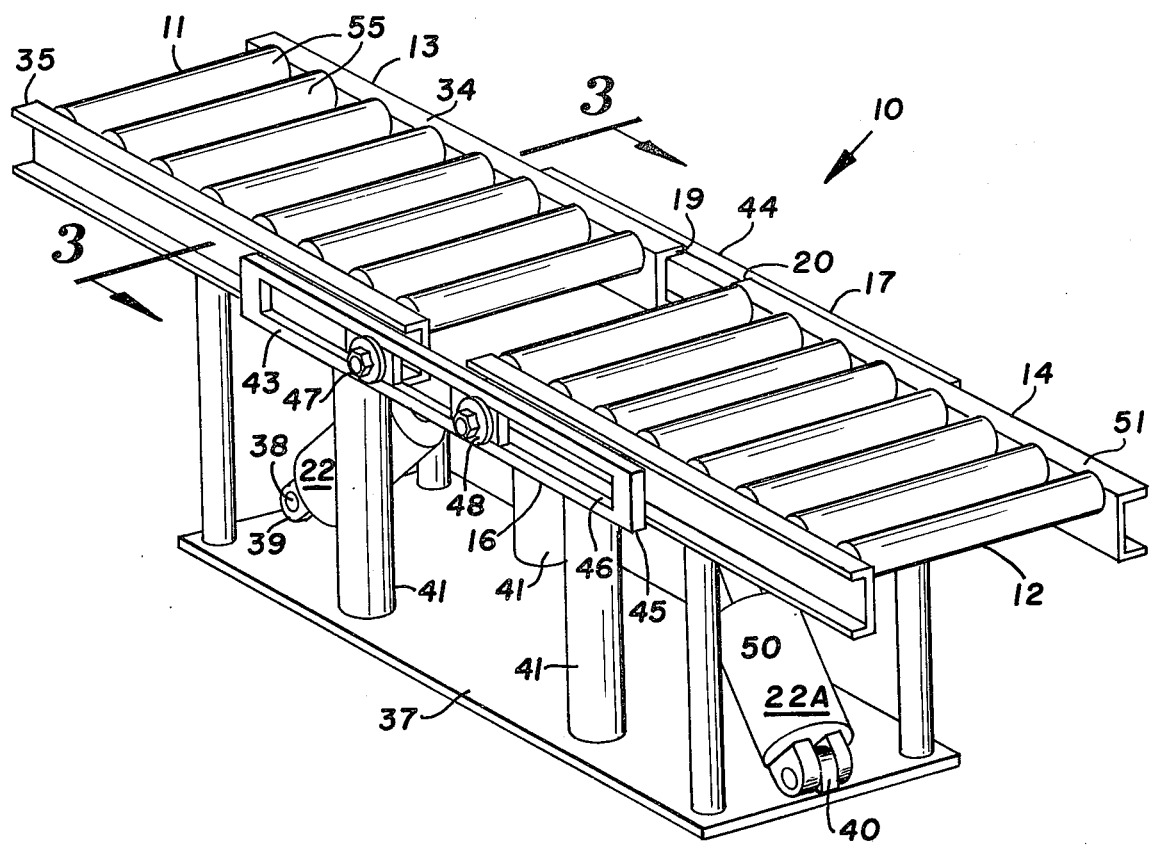
FIG. 1 is a perspective view of the work turnover means of the present invention, and illustrating the segments forming the section along with the articulating means.
Figure 2:
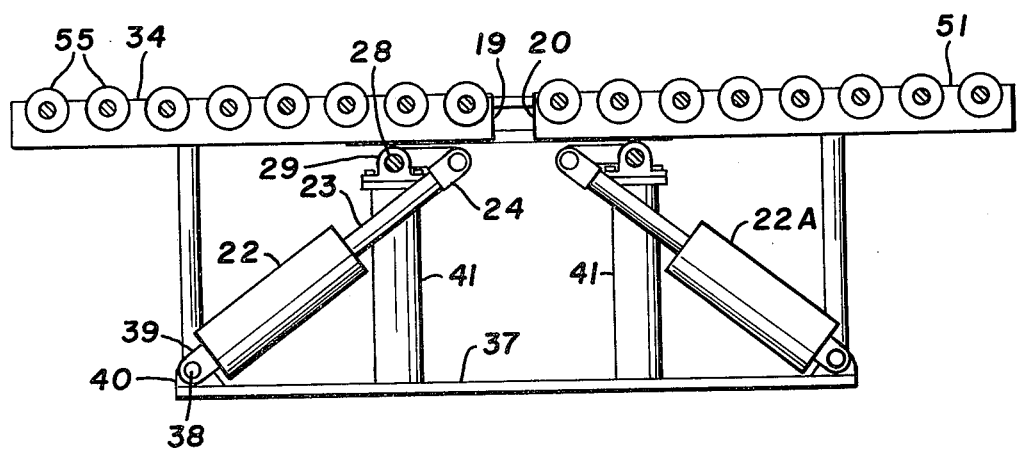
FIG. 2 is a side elevational view of the work turnover means with one of the lateral side rails removed.

In accordance with the preferred embodiment of the present invention, and with particular attention being directed to FIG. 1 of the drawings, it will be seen that the turnover device generally designated 10 comprises a conveyor means having a work-receiving end 11, a work-delivering end 12, with the entire turnover section comprising first and second conveyor segments 13 and 14. The segments 13 and 14 are coupled together with axially extending slide means 16 and 17, with the individual segments 13 and 14 terminating along mutually adjacent opposed surfaces 19 and 20.

Figures 3, 4:
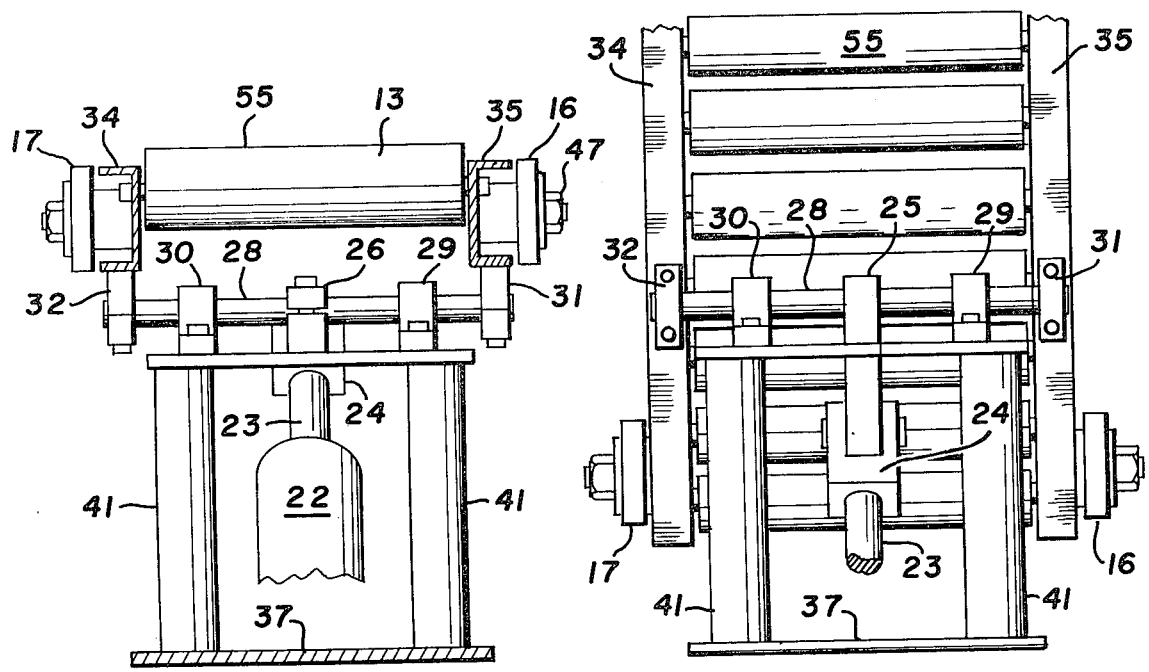
FIG. 3 is a vertical sectional view taken along the line and in the direction of the arrows 3—3 of FIG. 1.
FIG. 4 is an elevational view of one segment of the work turnover means, and illustrating the structure with the segment arranged in generally vertical articulated disposition.

Articulating means are provided for each of the turnover segments, with the articulating means being illustrated in greater detail in FIG. 4 of the drawings. Accordingly, with continued attention being directed to FIG. 1, and with additional attention being directed to FIG. 4, the articulating means includes the cylinder means 22 having a ram member 23 extending therefrom, the ram member terminating in a bifurcated yoke element 24 which, in turn, is coupled to link means 25. Link means 25 terminates welded to and fast on pivot shaft 28. Pivot shaft 28 is mounted for rotation within bushing or bearing members 29 and 39, with the outer free ends thereof being received in fastened relationship within clamping jaws 31 and 32. Jaws 31 and 32 are, as indicated, secured rigidly to the lateral rail elements 34 and 35 of conveyor segment 13, hence rotation of shaft 28 will, in turn, result in pivotal arcuate rotation of segment 13 about the axis of shaft 28. In order to accommodate shifting of cylinder 22 during the stroking of ram 23, cylinder 22 is secured to base frame means 37 by means of a pin 38 passing through the bifurcated element 39, and secured for pivotal rotation with mounting bracket 40, with a similar opposed bracket being shown at 40A. In order to achieve proper elevation of the conveyor above the surface, post elements such as posts 41—41 are provided.

The articulating means for segment 14 is identical to that of segment 13, and arranged in a mirror image relationship thereto. This is the arrangement utilized for the motion of the turnover means as illustrated in FIGS. 6–11 inclusive.

Figure 5:
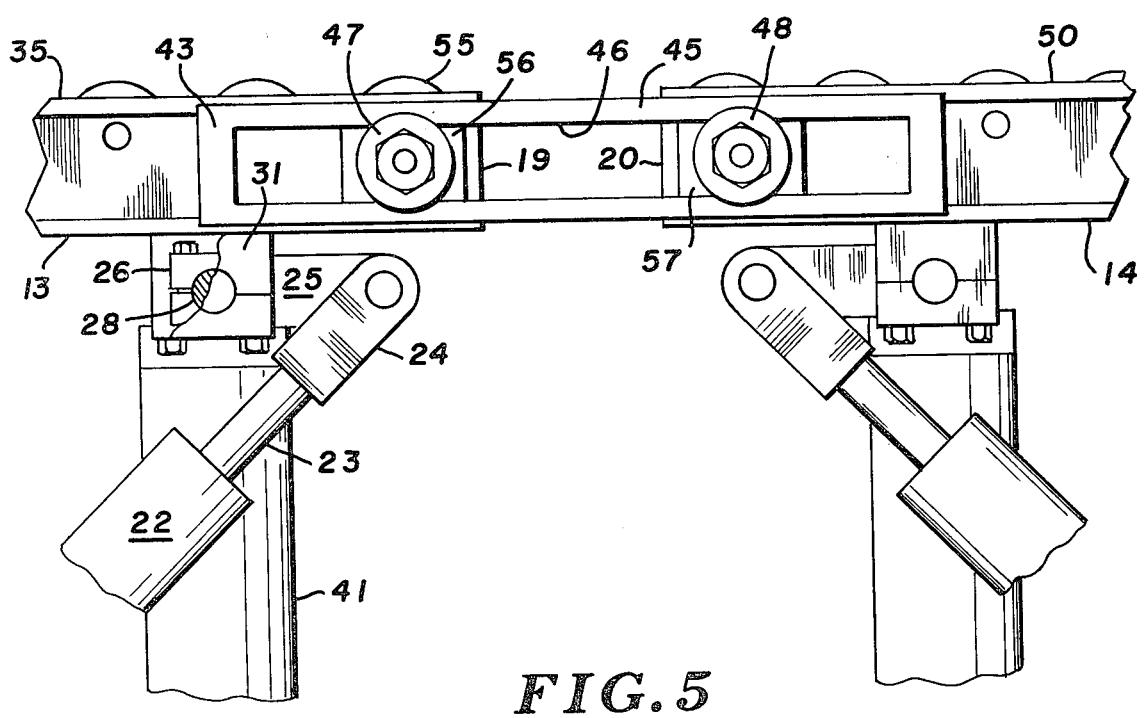
FIG. 5 is a detail front elevational view of the slide rail portion of the turnover device, and illustrating the manner in which the individual segments are coupled to the slide rail member.

Attention is now directed to FIG. 5 of the drawings wherein the details of the slide rails 16 and 17 are shown, such as slide rail body portions 43 and 44. These slide rails 16 and 17 function to permit relative motion to occur between the respective ends 19 and 20 of the segments 13 and 14, such as is illustrated in FIGS. 6–11 inclusive. Each of the slide rail body portions 43 and 44 are identical, one to the other, one being a lefthand mount, the other being a righthand mount. With attention being directed to FIG. 5, therefore, it will be seen that the slide rail body 43 includes a load supporting upper rail portion 45 having a slot area formed intermediately therein, as at 46. Projections 47 and 48 are formed on the rails 35 and 50, and are free to move axially along the length of slot 46. As will be appreciated, projections 47 and 48 are retained captive within the slotted area 46 in order to retain integrity of the apparatus.

While any of a variety of conveyor means may be utilized for this apparatus, the preferred form of conveyor is one utilizing cylindrical rollers such as the rollers 55-55. Each of these rollers is identical, one to the other, and is retained between respective side frames, such as the side frames 34 and 35, or side frames 50 and 51. For preserving the appearance of the individual workpieces that may pass thereover, rollers 55—55 may be covered with a resilient coating such as rubber or plastic. Such rollers are, of course, commercially available.

Attention is now directed to the sequence of views in FIGS. 6–11 inclusive for a description of the operation of the apparatus. Specifically, the workpiece 60 is shown as it moves from the incoming conveyor 61 and on to the turnover mechanism 10. Upon reaching the position illustrated in FIG. 6, forward motion of the workpiece 60 is interrupted while cylinder 22 is initially actuated. Actuation of cylinder 22 results in pivotal rotation of segment 13 in the manner illustrated in FIG. 7.

Upon achieving the disposition illustrated in FIG. 7, the righthand cylinder 22A is actuated and the segment 14 commences arcuate rotation as is illustrated in FIG. 8. This arcuate motion for segment 14 is continued until the disposition is reached as is illustrated in FIG. 9. In this view, the mechanism is in the form of a U and is capable thereafter of transferring the load rotated 180° from its incoming disposition. For example, cylinder 22 is retracted, thus achieving the disposition for segment 13 as is illustrated in FIG. 10, with segment 14 functioning as is indicated in the view of FIG. 10. Upon achieving the disposition illustrated in FIG. 10, cylinder 22 is actuated additionally in order to achieve the disposition of the apparatus as illustrated in FIG. 11.

If desired, a hard-surfaced roller conveyor device may be employed, however for preserving the quality of the work, it may, in certain instances, be desirable to employ a pallet or other work support member.

The apparatus of the present invention has been found to work extremely well with heavy loads such as stone or the like, particularly those stones which are being prepared for monument use. In such an operation, the opposed major surfaces of the work are normally chipped, and this chipping or other finishing operation is achieved with minimal interruption of the normal operations.

I claim:

1. Work turnover means for stone slabs and the like comprising, in combination:
   a. conveyor means having a work-receiving end, a work-delivering end and with a work turnover section therebetween;
   b. said turnover section comprising first and second axially aligned segments, with axial extending elongated slide means arranged laterally along each side of said axially aligned segments for adjustably coupling said segments together, each of said axially aligned segments terminating along mutually adjacent opposed terminal free end surfaces and being normally arranged in closely spaced relationship, one with the other;
   c. articulating means for each of said turnover segments including pivot means pivotally mounting each of said axially aligned segments intermediate the ends thereof and at a point spaced from said terminal free end and arranging for arcuate pivotal rotation of said segment about a generally horizontal pivot axis disposed at right angles to said turnover section axis, and first and second power sources for delivering reciprocatory motion to each of said axially aligned turnover segments, link means coupling each of said power sources to respective first and second turnover section segments at a point along the turnover segment to which it is attached at a force applying point spaced from said generally horizontally disposed pivot axis, the arrangement being such so as to provide general vertical disposition of each of said turnover segments adjacent said generally horizontal pivot axis, with the terminal ends thereof being spaced apart axially a substantial distance one from the other at opposed ends of said elongated slide means when said turnover segments are in said vertical disposition.

2. The work turnover means as defined in claim 1 being particularly characterized in that said articulating means includes a reciprocatory hydraulic cylinder.

3. The work turnover means as defind in claim 1 being particularly characterized in that said conveyor means includes a pair of laterally disposed rails having a plurality of generally cylindrical rollers disposed therebetween for supporting the work thereon, and with said elongated slide means being disposed laterally outwardly of each of said rails.

* * * * *